United States Patent
Thorn et al.

(10) Patent No.: US 8,340,365 B2
(45) Date of Patent: Dec. 25, 2012

(54) USING IMAGE RECOGNITION FOR CONTROLLING DISPLAY LIGHTING

(75) Inventors: Ola Karl Thorn, Lund (SE); Simon Lessing, Lund (SE)

(73) Assignee: Sony Mobile Communications AB, Lund (SE)

( * ) Notice: Subject to any disclaimer, the term of this patent is extended or adjusted under 35 U.S.C. 154(b) by 1334 days.

(21) Appl. No.: 11/561,627

(22) Filed: Nov. 20, 2006

(65) Prior Publication Data

US 2008/0118152 A1    May 22, 2008

(51) Int. Cl.
*G06K 9/00* (2006.01)
(52) U.S. Cl. .................. 382/118; 382/103; 382/190
(58) Field of Classification Search .............. 382/190, 382/103; 345/102, 690
See application file for complete search history.

(56) References Cited

U.S. PATENT DOCUMENTS

| | | | |
|---|---|---|---|
| 6,362,835 B1 * | 3/2002 | Urbanus et al. | 345/692 |
| 6,665,805 B1 | 12/2003 | Tsirkel et al. | |
| 6,765,608 B1 * | 7/2004 | Himeda et al. | 348/211.5 |
| 6,933,956 B2 * | 8/2005 | Sato et al. | 345/690 |
| 6,977,636 B2 * | 12/2005 | Jinda et al. | 345/94 |
| 7,038,651 B2 * | 5/2006 | Nitta et al. | 345/98 |
| 7,627,139 B2 * | 12/2009 | Marks et al. | 382/103 |
| 2002/0126895 A1 * | 9/2002 | Satoh | 382/190 |
| 2003/0052903 A1 | 3/2003 | Weast | |
| 2003/0146897 A1 * | 8/2003 | Hunter | 345/102 |
| 2003/0179221 A1 * | 9/2003 | Nitta et al. | 345/690 |
| 2004/0001082 A1 * | 1/2004 | Said | 345/730 |
| 2005/0069207 A1 * | 3/2005 | Zakrzewski et al. | 382/190 |
| 2005/0071698 A1 | 3/2005 | Kangas | |
| 2005/0270386 A1 * | 12/2005 | Saitoh et al. | 348/239 |

OTHER PUBLICATIONS

Written Opinion/International Search Report for related PCT Application No. PCT/IB2007/051861, mailed Sep. 27, 2007 (13 pages).
International Preliminary Report on Patentability issued for corresponding international application No. PCT/IB2007/051861, mailed Feb. 3, 2009 (7 pages).
Written Opinion of the International Preliminary Examining Authority issued for corresponding international application No. PCT/IB2007/051861, mailed Dec. 1, 2008 (7 pages).

* cited by examiner

*Primary Examiner* — Vu Le
*Assistant Examiner* — Aklilu Woldemariam
(74) *Attorney, Agent, or Firm* — Snyder, Clark, Lesch & Chung, LLP (57) ABSTRACT

A system obtains an image that depicts a region adjacent a display device. The system determines a content of the image and alters a lighting level associated with the display device based on the determined content of the image.

22 Claims, 5 Drawing Sheets

100% BACKLIGHT        30% BACKLIGHT        BLACK SCREEN

FIG. 5A           FIG. 5B          FIG. 5C

USING IMAGE RECOGNITION FOR CONTROLLING DISPLAY LIGHTING

TECHNICAL FIELD OF THE INVENTION

Implementations described herein relate generally to output displays associated with electronic devices and, more particularly, to controlling the lighting of such output displays using image recognition techniques.

BACKGROUND

Mobile devices, such as, for example, cellular radiotelephones, laptops, and personal digital assistants (PDAs), have been increasingly used for viewing multimedia content (e.g., games, movies, music, pictures, etc.). Since the screen display of a mobile device is one of the device components that consume the most electrical power in the mobile device, viewing of multimedia content has increased battery consumption within the mobile devices, decreasing the amount of time a user may use the mobile device on a given charge of the battery.

In order to save battery charge, most mobile devices use "sleep" mode "timeouts" such that after a certain period of time without user activity, the screen display is either turned off or its lighting intensity is reduced. User activity is usually measured on the basis of how long its been since an input device (e.g., mouse, joystick, keyboard, touchpad) has been used. This measurement of user activity is very crude and does not consider that many user activities do not involve "physical" user interaction. For example, viewing pictures or browsing the web on the mobile device are user activities that do not necessarily involve physical user interaction with the mobile device.

SUMMARY

According to one aspect, a method may include obtaining an image that depicts a region adjacent a display device and determining a content of the image. The method may further include altering a lighting level associated with the display device based on the determined content of the image.

Additionally, the display device may include at least one of a liquid crystal display (LCD) display device, a light-emitting diode (LED) display device, a plasma screen display device, a cathode ray tube (CRT) display device, or an organic LED display device.

Additionally, the display device may be a component of a cellular radio-telephone and the image may be obtained from a camera of the cellular radiotelephone.

Additionally, altering the lighting level associated with the display device may include: adjusting a backlighting of the display device.

Additionally, determining a content of the image may include determining a position of a person's face contained in the image.

Additionally, determining the position of the person's face contained in the image may include determining a position of the person's face relative to the display device.

Additionally, altering the lighting level associated with the display device may include increasing the lighting level associated with the display device when the determined position of the person's face relative to the display device indicates that the person is facing the display device.

Additionally, altering the lighting level associated with the display device may include decreasing the lighting level associated with the display device when the determined position of the person's face relative to the display device indicates that the person is facing, at least partially, away from the display device.

According to another aspect, a method may include receiving one or more images and analyzing the one or more images to determine a position of a person's face relative to a display unit. The method may further include adjusting a lighting level associated with the display unit based on the determined position of the person's face.

According to an additional aspect, a system may include a display device and an image capturing device positioned with respect to the display device to obtain one or more images of a region adjacent the display device. The system may further include a processing unit configured to determine a content of the one or more images, and alter a lighting level associated with the display device based on the determined content of the image.

Additionally, the display device may include at least one of a liquid crystal display (LCD) display device, a light-emitting diode (LED) display device, a plasma screen display device, a cathode ray tube (CRT) display device, or an organic LED display device.

Additionally, the system may include a radio-telephone device.

Additionally, where when altering the lighting level associated with the display device, the processing unit may be configured to adjust a backlighting of the display device.

Additionally, where when determining a content of the one or more images, the processing unit may be configured to determine a position of a person's face contained in the image.

Additionally, where when determining the position of the person's face contained in the image, the processing unit may be configured to determine a position of the person's face relative to the display device.

Additionally, when altering the lighting level associated with the display device, the processing unit may be configured to increase the lighting level associated with the display device when the determined position of the person's face relative to the display device indicates that the person is facing the display device.

Additionally, where when altering the lighting level associated with the display device, the processing unit may be configured to decrease the lighting level associated with the display device when the determined position of the person's face relative to the display device indicates that the person is facing away from the display device.

Additionally, where the display device and the image capturing device are positioned such that a display screen of the device and a lens of the image capturing device face toward the region adjacent the display device.

According to yet another aspect, a device may include means for obtaining an image from a camera and means for analyzing the image to determine a position of a person's face relative to a display unit. The device may further include means for adjusting a lighting level associated with the display unit based on the determined position of the person's face.

According to an additional aspect, a method may include directing a camera towards a specific region and obtaining an image of the specific region from the camera. The method may also include analyzing the image to determine a content of the image and controlling a lighting level associated with a display device based on the determined content.

Additionally, a display face of the display device may be directed towards the specific region.

Additionally, the display device may include a visual display of a radiotelephone.

Additionally, where a person is located in the specific region and where analyzing the image includes determining a position of the person's face relative to the display device.

Additionally, where analyzing the image to determine a content of the image may further include using a facial recognition technique to determine the position of the person's face relative to the display device.

According to an additional aspect, a device may include a camera and a visual display, where the camera and a face of the visual display are directed towards a specific region. The device may further include a processing unit configured to receive an image of the specific region from the camera, analyze the image to determine a content of the image, and control a power level associated with the device based on the determined content.

Additionally, where a person may be located within the specific region and where when analyzing the image to determine a content of the image, the processing unit may be configured to determine a position of the person's face relative to the visual display.

Additionally, where when controlling a power level associated with the device, the processing unit may be configured to adjust a backlighting of the visual display based on the determined position of the person's face relative to the visual display.

According to yet another aspect, a computer-readable medium that stores computer-executable instructions may include instructions for receiving one or more images from at least one of a camera or a video unit, instructions for analyzing the one or more images to determine a position of a person's face relative to a display unit and instructions for controlling a lighting level associated with the display unit based on the determined position of the person's face.

According to an additional aspect, a method may include obtaining an image that depicts a region in a vicinity of a first display device and analyzing the image to determine a position of a person's face relative to the first display device. The method may further include adjusting a lighting level associated with a second display device, that is different than the first display device, based on the determined position of the person's face.

It should be emphasized that the term "comprises/comprising" when used in this specification is taken to specify the presence of stated features, integers, steps, components or groups but does not preclude the presence or addition of one or more other features, integers, steps, components or groups thereof.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION OF EMBODIMENTS

The following detailed description of the invention refers to the accompanying drawings. The same reference numbers in different drawings may identify the same or similar elements. Also, the following detailed description does not limit the invention.

Exemplary embodiments of the invention decrease usage of a device's battery by controlling the lighting of the device's screen display such that the screen display is only fully lit when a user is simultaneously viewing the screen display. If the user is not viewing the screen display, then the lighting of the screen display may be decreased to decrease usage of the device's battery. Exemplary embodiments of the invention use a camera and/or video unit to obtain one or more images of the user viewing the screen display, and an analysis of these one or more images may be performed using image recognition techniques, such as, for example, facial recognition/tracking techniques, to determine a position of the user's face relative to the screen display. If the image recognition analysis determines that the user is facing away from the screen display, then a light level associated with the screen display may be reduced proportionately to how much the user is facing away from the screen display. If the image recognition analysis determines that the user is facing the screen display, then the light level associated with the screen display may be increased to a level that permits easy user viewing of content displayed on the screen display.

Overview

Figure 1:
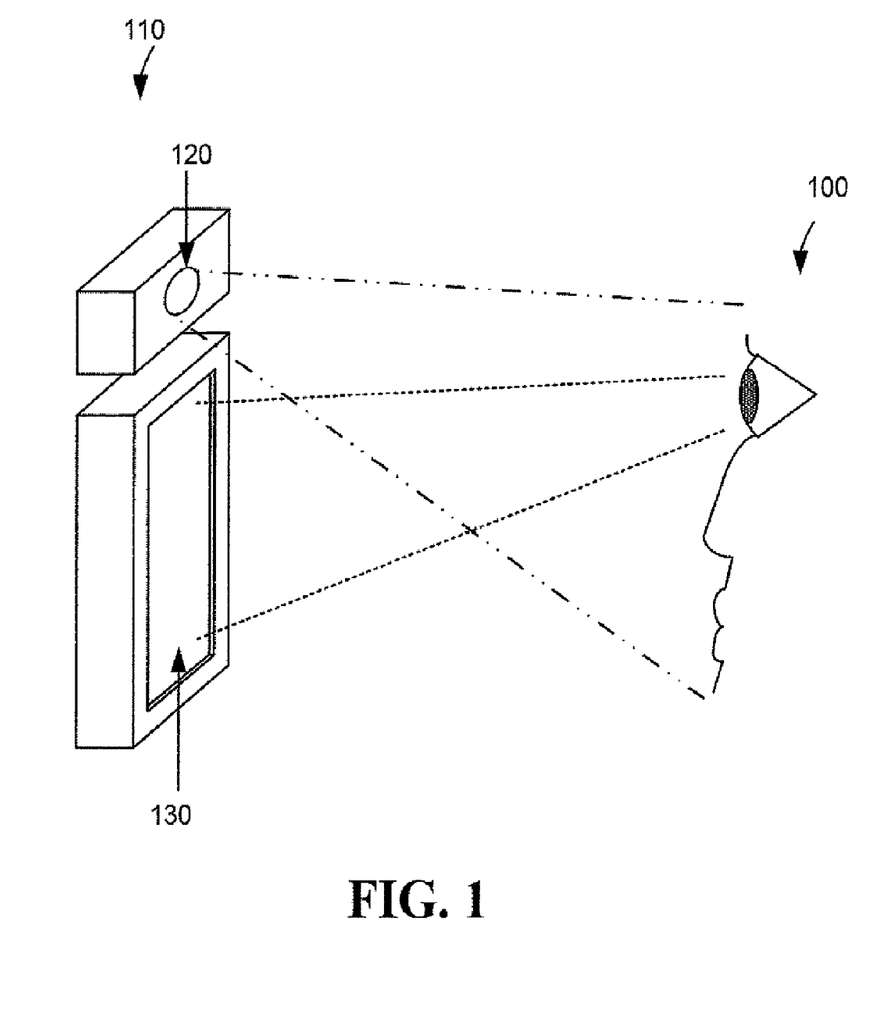
FIGS. 1 and 2 illustrate an overview of exemplary embodiments.

FIG. 1 illustrates an exemplary overview of the control of screen display lighting based on image recognition techniques. As shown in FIG. 1, a person 100 may use a device(s) 110 that includes a camera/video unit 120 and a display unit 130. Device(s) 110 may include one or more of any type of devices, with the one or more devices including a camera/video unit 120 and a display unit 130. Camera/video unit 120 may, for example, be included with display unit 130 in a single device 110, or camera/video unit 120 may be a separate device from display unit 130. For example, camera/video unit 120 may be included with display unit 130 within a single cellular radiotelephone. As another example, camera/video unit 120 may be physically separated from display unit 130, such as, for example, where display unit 130 includes a monitor for a desktop personal computer and camera/video unit 120 may be a camera/video unit connected to the desktop personal computer. In either situation, camera/video unit 120 may be positioned in relation to display unit 130 to allow device 110 to be able to determine where a person is facing relative to display unit 130.

Device(s) 110 may include any type of device that has any type of visual display, such as, for example, a liquid crystal display (LCD) device, a light-emitting diode (LED) device, a plasma screen display device, a cathode ray tube (CRT) device, or an organic LED (OLED) device. Device(s) 130 may include mobile and/or stationary devices and may further include a personal computer, a telephone, a cellular radiotelephone, a Personal Communications System (PCS) terminal or the like. A PCS terminal may combine a cellular radiotelephone with data processing, facsimile and/or data communications capabilities. Device(s) 110 may further include a personal digital assistant (PDA), a conventional laptop and/or palmtop receiver, a desktop computer, a television set, or another type of appliance. A PDA may include a radiotelephone, a pager, Internet/intranet access, a web browser, an organizer, calendars and/or a global positioning system (GPS) receiver. Device(s) 110 may further be referred to as a "pervasive computing" device.

As depicted in FIG. 1, a person 100 using device(s) 110 may view the screen display of display unit 130, while camera/video unit 120, which is directed towards person 100, obtains one or more images of person 100. A processing unit (not shown) associated with device(s) 110 may process the one or more images, using image recognition techniques, to determine a position of person 100's face relative to the display face of display unit 130. The processing unit may adjust the lighting of display unit 130 based on the determined position of person 100's face relative to the display face of display unit 130. Thus, according to exemplary embodiments, the lighting of display unit 130 may be decreased (e.g., decreased backlighting) when person 100's face is turned away from display unit 130, and increased (e.g., increased towards 100% backlighting) when person 100's face is turned towards display unit 130.

Figure 2:
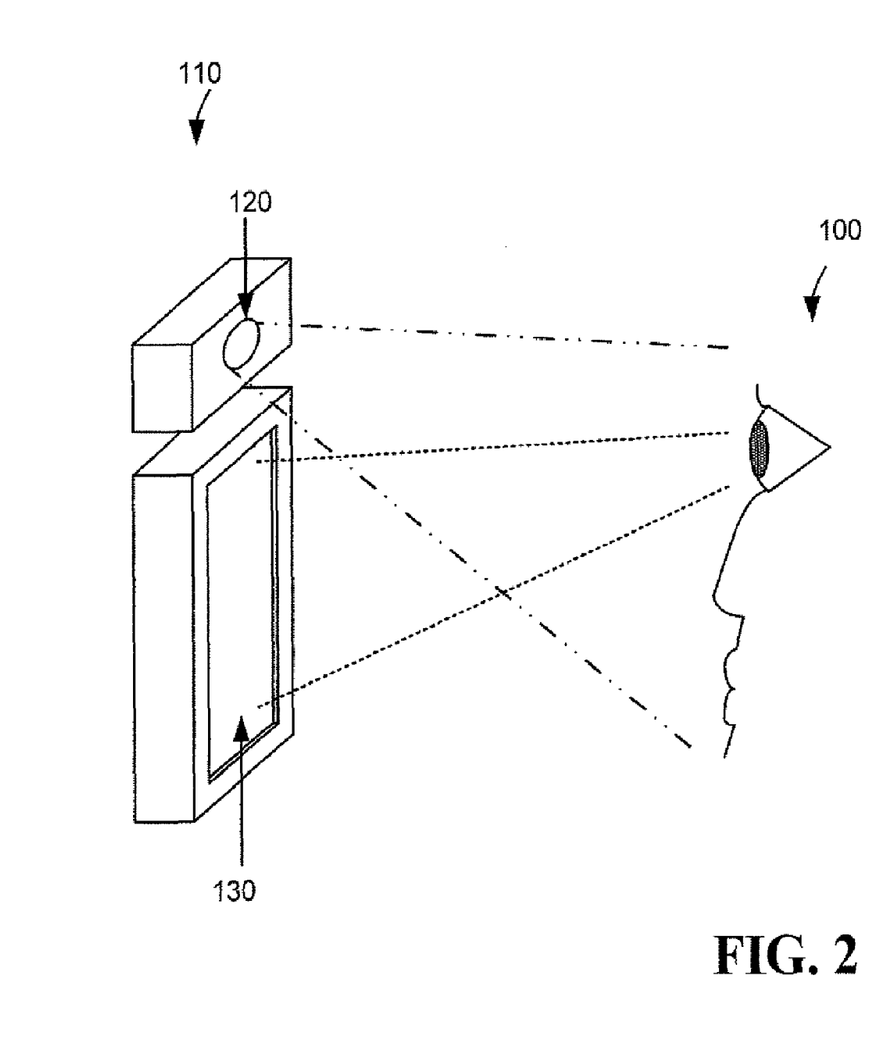

FIG. 2 illustrates another exemplary embodiment in which a person may be using two devices 110 and 200. In this exemplary embodiment, when person 100 views the screen display of display unit 130 of device(s) 110, a lighting level associated with the screen display of display unit 210 of device 200 may be decreased. For example, in one embodiment, device 110 may include a laptop computer and device 200 may include a cellular radiotelephone.

In the exemplary embodiment of FIG. 2, camera/video unit 120, which is directed towards person 100, obtains one or more images of person 110. A processing unit (not shown) associated with device(s) 110 may process the one or more images, using image recognition techniques, to determine a position of person 100's face relative to relative to the display face of display unit 130. The processing unit may adjust the lighting level of display unit 210 based on the determined position of person 100's face relative to the display face of display unit 130. Thus, according to this exemplary embodiment, the lighting of display unit 210 may be decreased when person 100's face is turned towards display unit 130 (and, correspondingly, possibly away from display unit 210), and increased when person 100's face is turned away from display unit 130 (and, correspondingly, possibly towards display unit 210). Device(s) 110 and device 200 may, in the exemplary embodiment of FIG. 2, operate in a networked environment so that the position of person 110's face relative to one of the devices (e.g., device(s) 110) may be used to adjust the lighting level associated with a display unit of another of the devices.

Exemplary Device

Figure 3:
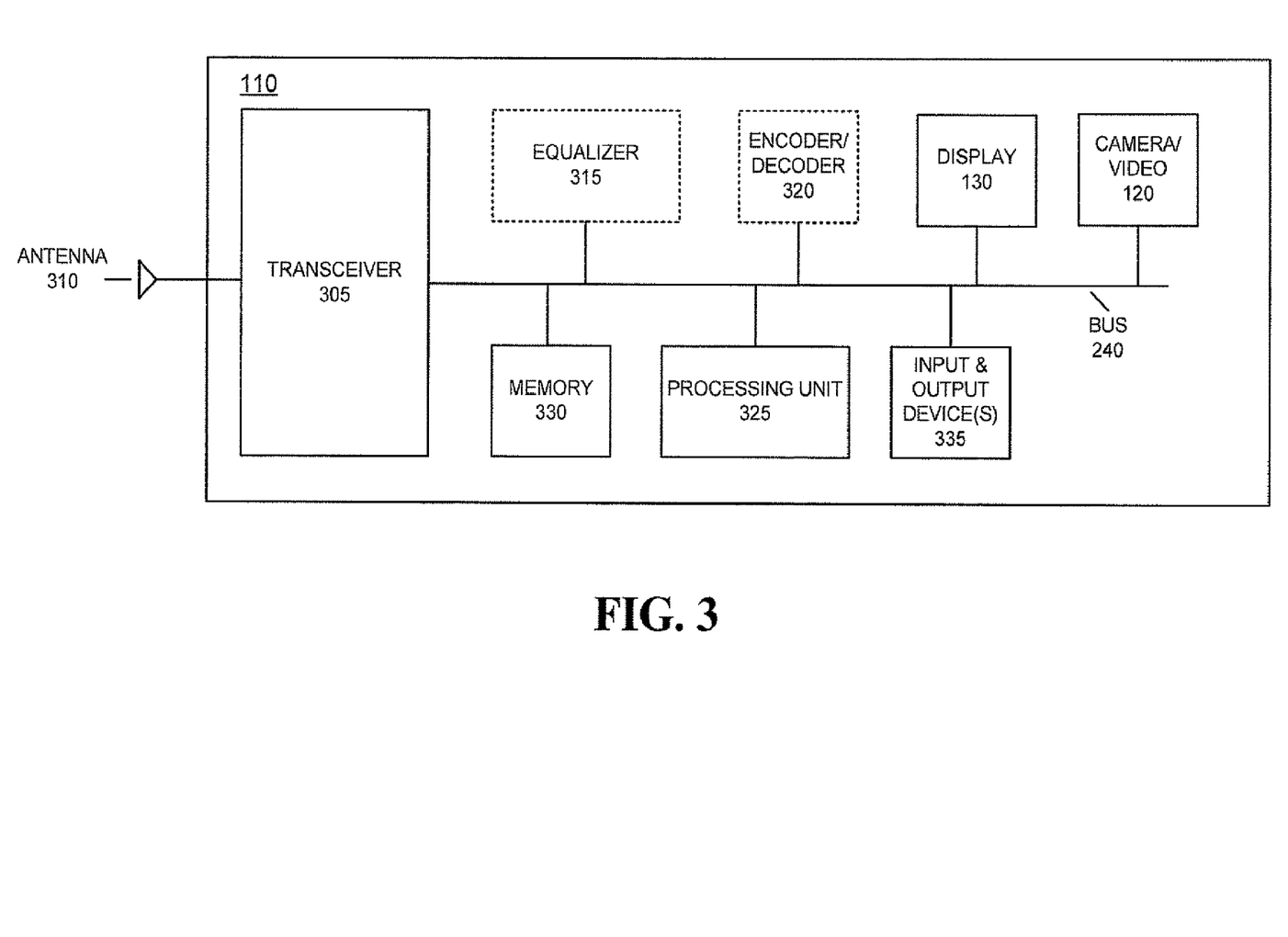
FIG. 3 illustrates a configuration of a device of FIG. 1 or 2 according to an exemplary embodiment.

FIG. 3 illustrates an exemplary embodiment in which device 110 includes a radio transceiver. Device 110 of the exemplary embodiment of FIG. 3 may include, for example, a cellular radiotelephone, a personal digital assistant (PDA), a conventional laptop and/or palmtop receiver, or the like. Device 110 may include a transceiver 305, an antenna 310, an optional equalizer 315, an optional encoder/decoder 320, a processing unit 325, input and output device(s) 335, a display unit 130, a camera/video unit 120 and a bus 340.

Transceiver 305 may include known transceiver circuitry for transmitting and/or receiving symbol sequences using radio frequency signals via antenna 310. Transceiver 305 may include, for example, a conventional RAKE receiver. Transceiver 305 may further include mechanisms for estimating the signal-to-interference ratio (SIR) of received symbol sequences. Transceiver 305 may additionally include mechanisms for estimating the propagation channel Doppler frequency.

Equalizer 315 may store and implement Viterbi trellises for estimating received symbol sequences using, for example, a maximum likelihood sequence estimation technique. Equalizer 315 may additionally include mechanisms for performing channel estimation. Encoder/decoder 320 may include circuitry for decoding and/or encoding received or transmitted symbol sequences. Processing unit 325 may perform all data processing functions for inputting, outputting, and processing of data including data buffering and terminal control functions, such as call processing control, user interface control, or the like. Processing unit 325 may additionally perform image recognition (as described further below), and control a lighting level associated with display unit 130 based on results of the image recognition.

Memory 330 provides permanent, semi-permanent, or temporary working storage of data and instructions for use by processing unit 325 in performing processing functions. Memory 330 may include large-capacity storage devices, such as a magnetic and/or optical recording medium and its corresponding drive. Input and output device(s) 335 may include mechanisms for entry of data into device 110 and for outputting data in audio and/or hard copy format. For example, input and output device(s) 335 may include a user interface and a microphone (not shown). The microphone can include mechanisms for converting auditory input into electrical signals.

Display unit 130 may include a screen display that may display images and/or video, and may also provide a graphical user interface that can be used by a user for selecting device 110 functions. The screen display of display unit 130 may include any type of visual display, such as, for example, an LCD display, a plasma screen display, an LED display, a CRT display, an OLED display, etc. Camera/video unit 120 may include existing camera and/or video devices for obtaining and storing images. Bus 340 interconnects the various components of device 110 to permit the components to communicate with one another. The configuration of components of device 110 illustrated in FIG. 3 is for illustrative purposes only. One skilled in the art will recognize that other configurations may be implemented.

Exemplary Screen Display

Lighting Adjustment Process

Figure 4:
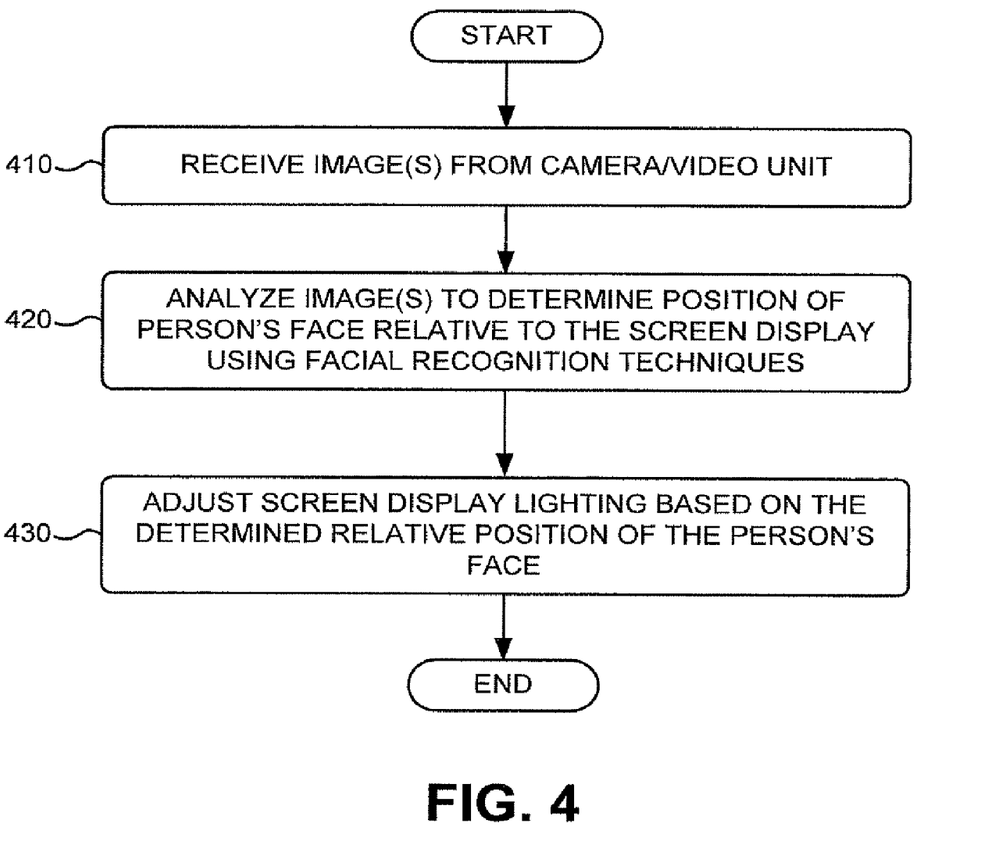
FIG. 4 is a flowchart of an exemplary screen display lighting adjustment process according to an exemplary embodiment.

FIG. 4 is a flowchart of a screen display lighting adjustment process according to an exemplary embodiment. The process exemplified by FIG. 4 may be implemented by processing unit 325 of device 110.

The exemplary process may begin with the receipt of an image(s) from camera/video unit 120 (block 410). Camera/video unit 120 may be pointed towards a given region and an image or video may be taken that depicts the region. In one example, a person using device 110 may be located in the region towards which the camera/video unit 120 is pointed. Camera/video unit 120 may obtain an image or video of the person in the region, such as, for example, an image or video of the person's face.

Figure 5A:
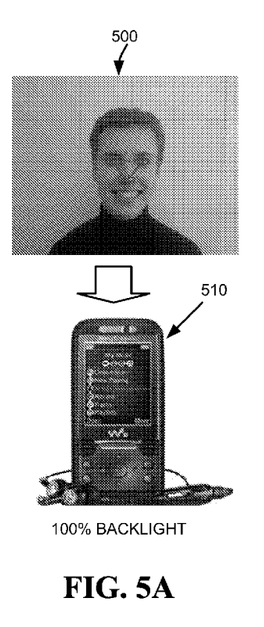
FIGS. 5A, 5B and 5C depict examples of the exemplary screen display lighting adjustment process of FIG. 4.

The image(s) may be analyzed to determine a position of a person's face relative to the screen display of display unit 130 using facial recognition techniques (block 420). Existing facial recognition/tracking techniques may, for example, track the relative position of the person's eyes and nose. For example, as shown in image 500 of FIG. 5A, the person's face, as determined by facial recognition techniques, may be determined to be facing display unit 130. As another example, as shown in image 520 of FIG. 5B, the person's face, as determined by facial recognition techniques, may be facing partially away from display 130. As a further example, as shown in image 540 of FIG. 5C, the person's face, as determined by facial recognition/tracking techniques, may be facing away from display unit 130.

Figure 5B:
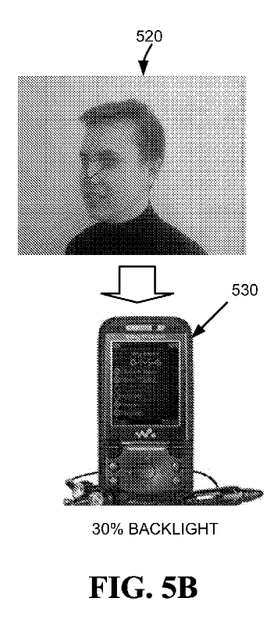
Figure 5C:
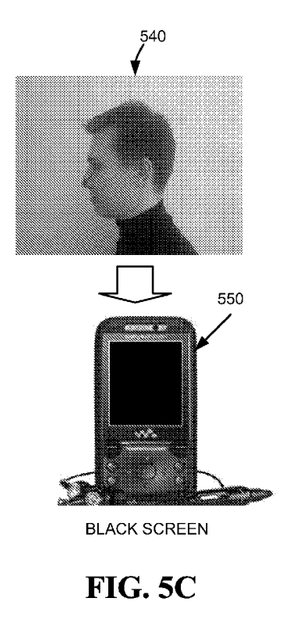

The screen display lighting may be adjusted based on the determined relative position of the person's face (block 430). The screen display lighting may be reduced proportionately to the extent to which the person is facing away from the screen display. Returning to the example of FIG. 5A, if an analysis of image 500 determines that the person's face is facing display 130, then the lighting level 510 of display 130 of device 10 may be increased to its brightest level (e.g., 100% backlighting). Further, as shown in the example of FIG. 5B, if an analysis of image 520 determines that the person's face is facing partially away from display 130, then the light level 530 of display 130 of device 110 may be decreased an amount from its brightest level (e.g., decreased to 30% backlighting). Additionally, as shown in the example of FIG. 5C, if an analysis of image 540 determines that the person's face is facing away from display 130, then the light level 550 of display 130 of device 110 may be decreased to its lowest level (e.g., decreased to a black screen with 0% backlighting). Adjustment of a lighting level associated with display 130, thus, permits a decrease in the amount of power consumed by display 120 when the person is not viewing display 130. As long as it is determined that the person using device 110 is facing the screen display, no "sleep" mode timeout may be triggered which turns off the screen display. Thus, existing sleep mode timeouts may be disabled when the person is viewing display 130 with control of lighting levels associated with the screen display being controlled by facial recognition and tracking, as described herein. In some implementations, the screen display lighting may be adjusted by adjusting a power level of device 110 (e.g., adjusting a power level applied to the screen display lighting).

Adjustment of screen display lighting, according to exemplary embodiments, may include any techniques for controlling the screen display to reduce its power consumption. For example, such techniques may include partially or wholly shutting down or turning off the screen display, adjusting lighting intensity or brightness associated with an entirety of, or portions of (e.g., individual LEDs or OLEDs), the screen display, etc. Adjustment of screen display lighting, as described above with respect to block 430, may include adjusting lighting associated with another display device, such as display unit 210 of device 200, as depicted in FIG. 2.

CONCLUSION

The foregoing description of implementations provides illustration and description, but is not intended to be exhaustive or to limit the invention to the precise form disclosed. Modifications and variations are possible in light of the above teachings, or may be acquired from practice of the invention. For example, while a series of acts has been described with regard to FIG. 4, the order of the acts may be modified in other implementations consistent with the principles of the invention. Further, non-dependent acts may be performed in parallel.

Aspects of the invention may also be implemented in methods and/or computer program products. Accordingly, the invention may be embodied in hardware and/or in software (including firmware, resident software, microcode, etc.). Furthermore, the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with principles of the invention is not limiting of the invention. Thus, the operation and behavior of the aspects were described without reference to the specific software code—it being understood that one of ordinary skill in the art would be able to design software and control hardware to implement the aspects based on the description herein.

Furthermore, certain portions of the invention may be implemented as "logic" that performs one or more functions. This logic may include hardware, such as an application specific integrated circuit or field programmable gate array, software, or a combination of hardware and software.

No element act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a device, the method comprising:
    receiving, at the device, one or more images;
    analyzing, by the device, the one or more images to determine a relative position of a person's eyes and nose within the one or more images indicative of a position of a person's face relative to a display unit; and
    adjusting, by the device, a lighting level associated with the display unit proportionately to the extent to which the person's face is facing away from the display unit as determined from the relative position of the person's eyes and nose within the one or more images.

2. The method of claim 1, wherein the display unit comprises at least one of a liquid crystal display (LCD) display device, a light-emitting diode (LED) display device, a plasma screen display device, a cathode ray tube (CRT) display device, or an organic LED display device.

3. The method of claim 1, wherein the display unit is a component of a cellular radio-telephone and the one or more images are obtained from a camera of the cellular radio-telephone.

4. The method of claim 1, wherein adjusting reducing the lighting level associated with the display unit comprises:
    decreasing a backlighting of the display unit.

5. A method performed by a device, the method comprising:
    receiving, by the device, one or more images that depict a region adjacent to a display unit associated with the device;
    analyzing, by the device, the one or more images to determine a relative position of a person's eyes and nose within the one or more images indicative of a position of a person's face relative to the display unit; and
    adjusting, by the device, a lighting level associated with the display unit proportionately to the extent to which the person's face is facing away from, or towards, the display unit as determined by the relative position of the person's eyes and nose within the one or more images, where the adjusting comprises:
        increasing the lighting level associated with the display unit proportionately to the extent to which the person's face is facing towards the display unit as determined by the relative position of the person's eyes and nose within the one or more images, and
        decreasing the lighting level associated with the display unit proportionately to the extent to which the person's face is facing away from the display unit as determined by the relative position of the person's eyes and nose within the one or more images.

6. The method of claim 5, wherein the display unit comprises at least one of a liquid crystal display (LCD) display device, a light-emitting diode (LED) display device, a plasma screen display device, a cathode ray tube (CRT) display device, or an organic LED display device.

7. The method of claim 5, where the device comprises a cellular radiotelephone, a computer, a telephone, or a personal digital assistant.

8. The method of claim 5, wherein adjusting the lighting level associated with display unit comprises:
adjusting a backlighting of the display unit.

9. A device, comprising:
means for obtaining an image;
means for analyzing the image to determine a relative position of a person's eyes and nose within the image indicative of a position of a person's face relative to a display unit; and
means for reducing a lighting level associated with the display unit proportionately to the extent to which the person's face is facing away from the display unit as determined from the relative position of the person's eyes and nose within the image.

10. A device, comprising:
a camera;
a visual display, where the camera and a display screen of the visual display are directed towards a specific region;
a processing unit configured to:
receive an image of a person's face within the specific region from the camera,
use a facial recognition technique that determines a relative position of the person's eyes and nose within the image to determine a position of the person's face relative to the visual display, and
reduce a lighting level associated with the visual display proportionately to the extent to which the person's face is facing away from the visual display as determined from the relative position of the person's eyes and nose within the image.

11. A non-transitory computer-readable medium that stores computer-executable instructions, comprising:
instructions for receiving one or more images from at least one of a camera or a video unit;
instructions for analyzing the one or more images to determine a relative position of a person's eyes and nose within the one or more images indicative of a position of a person's face relative to a display unit; and
instructions for reducing a lighting level associated with the display unit proportionately to the extent to which the person's face is facing away from the display unit as determined from the relative position of the person's eyes and nose within the one or more images.

12. A method, comprising:
obtaining an image that depicts a region in a vicinity of a first display unit;
analyzing the image to determine a position of a person's face relative to the first display unit; and
adjusting a lighting level associated with a second display unit based on the determined position of the person's face relative to the first display unit,
wherein the first display unit is a component of a first device and the second display unit is a component of a second device, and
wherein the first device is different than, and physically separate from, the second device.

13. The method of claim 12, wherein adjusting the lighting level associated with the second display unit comprises:
decreasing the lighting of the second display unit when the person's face is turned towards the first display unit; and
increasing the lighting of the second display unit when the person's face is turned away from the first display unit.

14. The method of claim 12, wherein analyzing the image comprises:
using a facial recognition technique that determines a relative position of the person's eyes and nose within the image to determine the position of the person's face relative to the first display unit.

15. The method of claim 12, wherein the first device is a computer and the second device is a cellular radiotelephone.

16. The method of claim 12, wherein the first device and the second device operate in a networked environment.

17. The device of claim 9, wherein the display unit comprises at least one of a liquid crystal display (LCD) display device, a light-emitting diode (LED) display device, a plasma screen display device, a cathode ray tube (CRT) display device, or an organic LED display device.

18. The device of claim 9, wherein the display unit is a component of a cellular radio-telephone and the one or more images are obtained from a camera of the cellular radio-telephone.

19. The device of claim 9, wherein the means for reducing the lighting level associated with the display unit comprises:
means for decreasing a backlighting of the display unit.

20. The device of claim 10, wherein, when reducing the light level associated with the visual display, the processing unit is configured to:
decrease a backlighting of the visual display.

21. The device of claim 10, wherein the visual display comprises at least one of a liquid crystal display (LCD) display device, a light-emitting diode (LED) display device, a plasma screen display device, a cathode ray tube (CRT) display device, or an organic LED display device.

22. The device of claim 10, wherein the device comprises a cellular radiotelephone, a computer, a telephone, or a personal digital assistant.

* * * * *